United States Patent
Sague

(10) Patent No.: US 6,788,188 B2
(45) Date of Patent: Sep. 7, 2004

(54) MULTI-FUNCTION ELECTRONIC HORN WARNING SYSTEM

(75) Inventor: Alain Sague, Montesson (IT)

(73) Assignee: Fabbrica Italiana Accumulatori Motocarri, Montecchio Maggiore (IT)

( * ) Notice: Subject to any disclaimer, the term of this patent is extended or adjusted under 35 U.S.C. 154(b) by 0 days.

(21) Appl. No.: 10/333,804

(22) PCT Filed: Jul. 12, 2001

(86) PCT No.: PCT/EP01/08082

§ 371 (c)(1),
(2), (4) Date: Apr. 4, 2003

(87) PCT Pub. No.: WO02/07992

PCT Pub. Date: Jan. 31, 2002

(65) Prior Publication Data

US 2003/0184434 A1 Oct. 2, 2003

(30) Foreign Application Priority Data

Jul. 25, 2000 (IT) .................. MI2000U0438

(51) Int. Cl.[7] .............................................. G08B 3/10
(52) U.S. Cl. ......................... 340/384.72; 340/384.72; 340/384.1; 340/384.5; 340/384.6; 340/384.7
(58) Field of Search ................... 340/384.72, 384.1, 340/384.4, 384.5, 384.6, 384.7

(56) References Cited

U.S. PATENT DOCUMENTS

| 4,219,799 | A | * | 8/1980 | Weber | 340/425.5 |
| 4,785,280 | A | | 11/1988 | Fubini et al. | 340/52 F |
| 5,602,523 | A | * | 2/1997 | Turchioe et al. | 340/384.2 |
| 5,754,095 | A | | 5/1998 | Bader et al. | 340/384.7 |
| 6,489,885 | B2 | | 12/2002 | Solow | 340/384.3 |
| 6,677,853 | B1 | * | 1/2004 | Canfield | 340/384.2 |

FOREIGN PATENT DOCUMENTS

| DE | 81 36 680.9 | 4/1982 |
| DE | 38 12 144 A1 | 10/1989 |
| DE | 19539738 A | 2/1997 |
| EP | 0 472 971 A2 | 3/1992 |
| EP | 0 657 869 A1 | 6/1995 |
| EP | 0 919 437 A1 | 6/1999 |
| EP | 0 939 437 A1 | 6/1999 |
| FR | 1 300 695 | 6/1962 |
| FR | 2 687 623 A1 | 8/1993 |
| FR | 2 791 620 A1 | 10/2000 |
| GB | 523482 | 7/1940 |
| KR | 9208716 | 10/1992 |
| WO | WO 94/26550 | 11/1994 |
| WO | WO 94/26555 | 11/1994 |

OTHER PUBLICATIONS

Vocal Alarm.

* cited by examiner

*Primary Examiner*—Daniel J. Wu
*Assistant Examiner*—Tai T. Nguyen
(74) *Attorney, Agent, or Firm*—Gifford, Krass, Groh, Sprinkle, Anderson & Citkowski, P.C.

(57) ABSTRACT

A multi-function electronic warning horn system comprises a couple of horns (1, 2) and a microprocessor (6), integrated in an electronic module (16) comprising a voltage adjuster (13), an oscillator (17), power stages (3, 4) and a control circuit (7). Horns (1, 2) are controlled by either the push-button (5) of the steering wheel for the traditional function of acoustic signaling or by a coded signal transmitted to microprocessor (6) by the "intelligent" electronic unit or onboard computer of the vehicle for the function of buzzer.

10 Claims, 2 Drawing Sheets

MULTI-FUNCTION ELECTRONIC HORN WARNING SYSTEM

FIELD OF THE INVENTION

The present invention relates to a multi-function electronic horn warning system.

More particularly, the present invention relates to a multi-function electronic horn warning system especially suitable to be applied on motor-vehicles provided with an "intelligent" electronic unit or onboard computer, intended for alarm signals in general.

BACKGROUND OF THE INVENTION

As is known, nearly all modern automobiles, trucks or the like that are available on the market today are equipped with acoustic or visual warning devices operative to alert others of a user's activation and/or deactivation of specific safety devices. It is also known that acoustic devices are designed, at present, with only one type of acoustic emission having only one duration, only one frequency, and only one sound level. They are mounted on vehicles during their construction and the one-tone acoustic signal the vehicles emit is indistinctly utilized for several types of signals, such as the signal associated with the opening/closing of doors, the activation/deactivation of anti-theft alarm systems and the like.

Additionally, the same acoustic devices are also adopted, for the same functions, by one or more manufacturers.

It is evident from the above that the one-tone signals emitted by said devices, though being effective for the first primary function of signaling irregular conditions, may be misinterpreted by users in two ways. First, in establishing what specific type of signal the intervention refers to among those that are submitted to the control circuit, and second, in establishing what vehicle said signals come from.

Document WO 94/26555 describes a multi-sound horn system comprising a sound select circuit and a group of pulse generators used to drive the horns. Each pulse generator is associated with a particular event, such as the change of status of the vehicle alarm, for producing a preselected sound.

SUMMARY OF THE INVENTION

An object of the present invention is to obviate the above drawbacks.

More particularly, an object of the present invention is to provide a horn warning system operative to identify to the type of signals each intervention refers to, and what type of vehicle said signals come from.

In accordance with the present invention, a multi function electronic warning system is provided.

Other objectives will become clear in view of the following description wherein a multi-function electronic horn warning system comprises a couple of horns, having related power stages, and a microprocessor which is integrated are an electronic module, which further includes a voltage adjuster, an oscillator, a control circuit and said power stages.

The horns are activated by a push-button on the steering wheel for the traditional function of the acoustic signal, otherwise they are controlled by a codified signal transmitted to the microprocessor by the "intelligent" electronic unit or onboard computer, for emitting the buzzer function.

Depending on the type of codified signal transmitted by the electric system of the vehicle, the electronic module generates sequential sounds, having programmable duration, frequency and sound levels.

Programming is done according to specifications of vehicle manufacturers, but consumers may be allowed to modify the program such that personalization of the acoustic signals related to the automatic-centralized closing and opening of doors and hoods, the activation and deactivation of anti-theft alarm systems, safety belts, switched on lights, obstacles in backing, or any other signal that allows the user to perceive a state of the vehicle may be programmed.

The acoustic signals emitted by the multi-function electronic horn warning system of the present invention can be programmed and personalized relative to duration, frequency and sound level, and their programming may be made either by vehicle manufacturers or the users.

The advantages achieved by the multi-function electronic horn warning system of the present invention lie essentially in that each model of vehicle marketed may be provided with a personalized and distinctive acoustic signal, with regard to other models of the same and/or other manufacturers. Additionally, each user can adjust, according to a personalized codification, the signals being emitted by the means mounted on his own vehicle(s), to distinguish the emitted signals from those emitted by vehicles of other users.

DESCRIPTION OF DRAWINGS

The constructive and functional characteristics of the multi-function electronic horn warning system of the present invention will be better understood in view of the following detailed description wherein reference is made to the attached drawings that illustrate the invention by way of non limiting examples, and wherein.

DESCRIPTION THE PREFERRED EMBODIMENT

Figure 1:
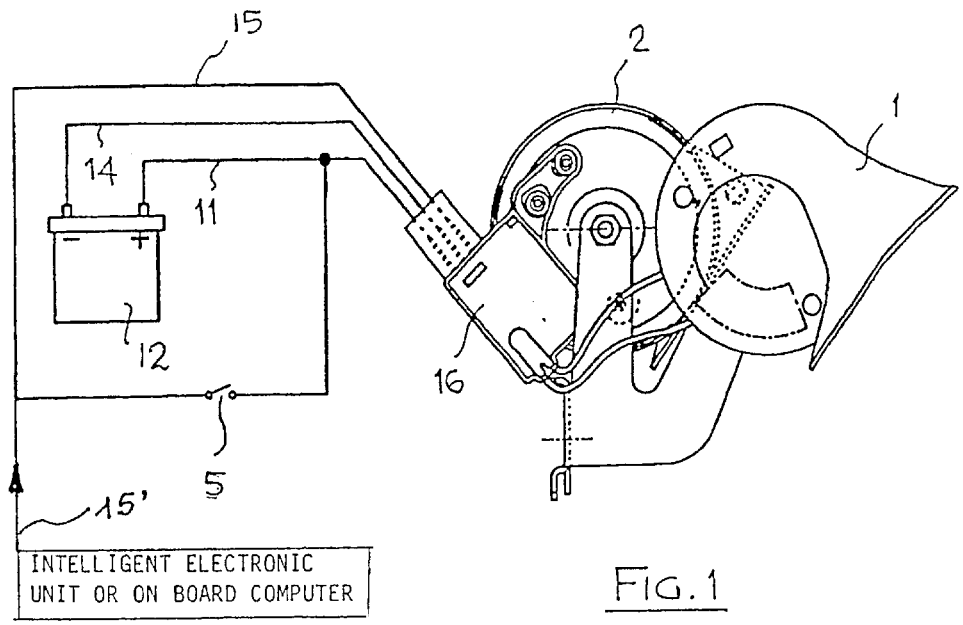
FIG. 1 shows an overall schematic view of the multi-functional electronic horn warning system of the present invention.
Figure 2:
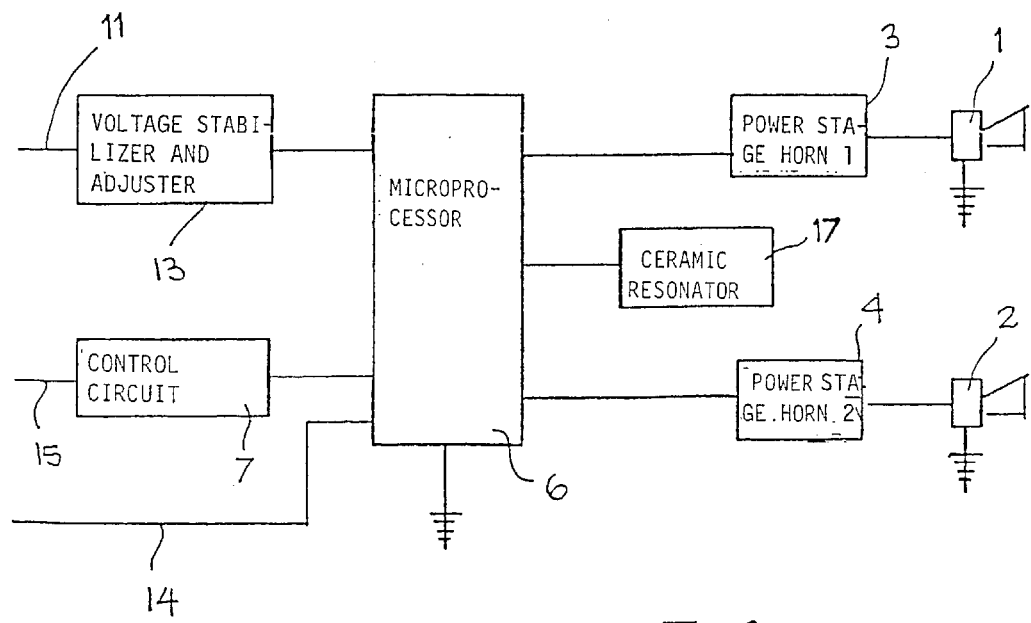
FIG. 2 shows the overall block scheme of the multi-functional electronic horn warning of FIG. 1.

With reference to the figures, the multi-function electronic horn warning system of the present invention comprises two horns 1 and 2, with the related power stages 3 and 4.

Horns 1 and 2 are bridge connected with each other and ready to be activated by either the push-button on the steering wheel 5 in a traditional manner wherein they operate as a horn warning, or by a codified electric signal transmitter by the "intelligent" electronic unit/onboard computer of the vehicle to a microprocessor 6 wherein they function as a signalling buzzer.

Microprocessor 6, connected to the horns, is programmed for the various functions. The processor 6 is capable of recognizing the type of signal on the control lead and activate the horns for the warning function or for the generation of the programmable sequence being comprised of a signal having variable duration, frequency and sound level cycles.

Figure 3:
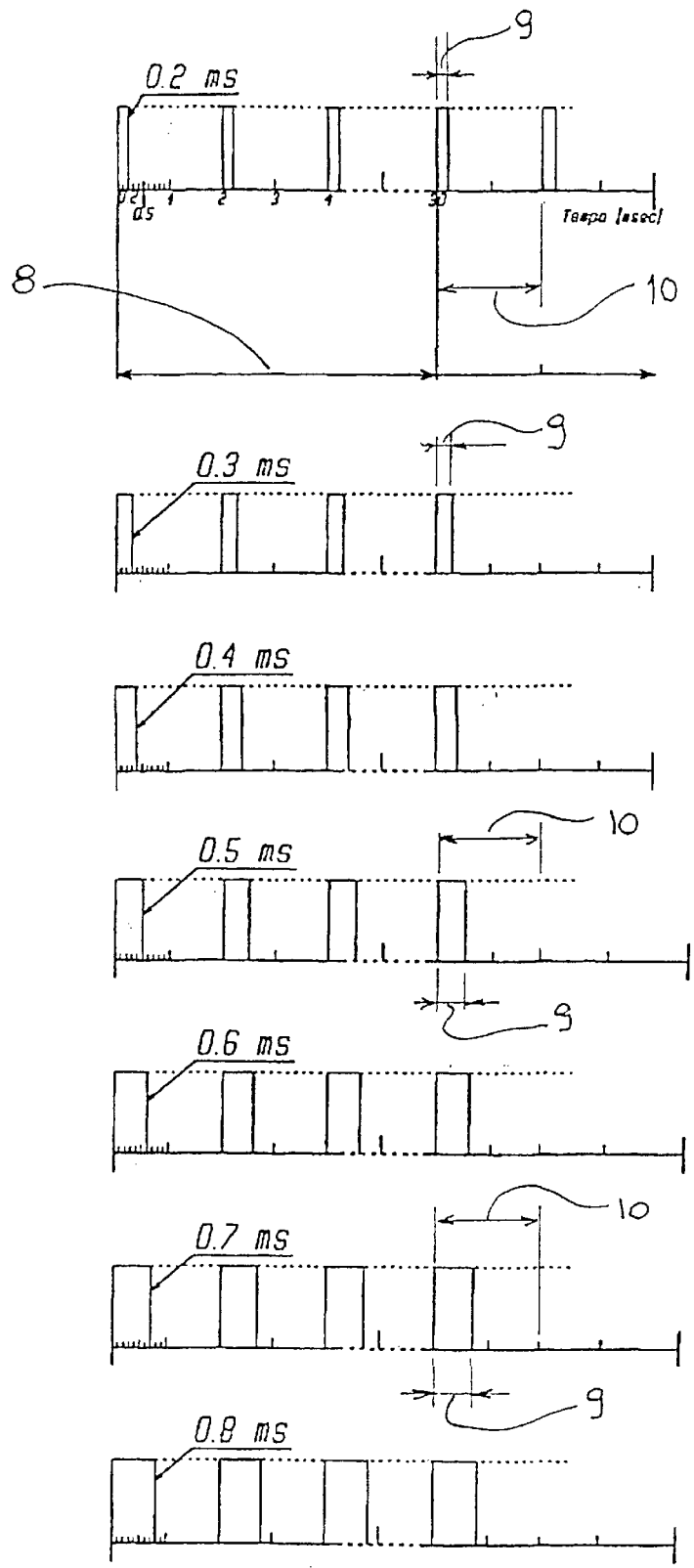
FIG. 3 shows an example of time domain of the programmable cyclic sound impulses of the buzzer.

The programming of such sound cycles is made through software directly by the vehicles' manufacturer, and may be modified for a possible personalization by the purchasing users through the "intelligent" electronic unit or onboard computer. An example of preset cycles capable of being used for the personalized programming of the acoustic signals differentiated by specific addresses (safety belts, switched on lights, on-alarm, obstacle in backing, opening/closing of doors and/or motor hood and/or trunk) is shown in FIG. 3. After a fixed time 8 necessary to decode the "buzzer key", the stage of acoustic emission of the signal begins, with a different duration 9, and the time interval 10 being the same. Time 8, which is necessary to decode the "buzzer key" (preferably about 30 msec), has the function of preventing any accidental triggering in case of control line transients. The impulses for the various cycles are square waves that change with regard to each other according to the duration of the active part: for instance, square waves of the duration of 2 msec for an active part of 200–800 µsec.

The form of the signal is not the cycle generated by the horn warning system, but the "key" to cause the set cycle to be executed.

If the push-button on the steering wheel is pressed, during the execution of any cycle whatever, the function of traditional horn warning activates.

The system comprises a first lead 11 to be connected to the positive pole (+) of a battery 12 through a voltage stabilizer and adjuster 13; a second lead 14 to be connected directly to the negative pole (−) of battery 12; a third lead 15, 15' to be connected to the electric system of the vehicle ("intelligent" electronic unit or onboard computer) whereon the coded signals suitable to drive the device travel.

Push-button 5 connects the positive line of the vehicle to said third lead 15.

A ceramic resonator or oscillator 17 has the function of generating the operating frequency of microprocessor 6, and constitutes a control for the coded signals. A circuit 7 comprises the conventional control functions of microprocessor 6.

The power stages 3, 4 have the function of opening and closing the passage of voltage on horns 1, 2 at the working frequency; they are located in parallel with condensers for the absorption of the energy stored by the respective bobbins.

The intervention of horns 1, 2 with the function of the traditional acoustic signalling, takes place at the time when a rather high voltage passes on the third lead 15, for instance 13 volt, coming from the battery on the closing of push-button 5.

The intervention of horns 1, 2 with the function of signaling buzzer happens at the time when a coded electric signal transmitted to microprocessor 6 by the "intelligent" unit or onboard computer passes on the third lead 15', according to the instructions obtained by the prefixed programming.

While the present invention has been described hereinabove with reference to an embodiment, it is obvious that many modifications and changes may be introduced by those skilled in the art, in light of the above description. It is therefore implied that the present invention intends to cover all the changes and modifications that fall within the spirit and the scope of the following claims.

What is claimed is:

1. A multi-function electronic horn warning system for a motor-vehicle having an onboard computer and a push-button (5) in communication with the onboard computer, said system having an acoustic warning function and a signalling buzzer function wherein the signalling buzzer function provides notification of a state of the motor-vehicle by generating sound cycles, said horn warning system comprising:
    a horn (1;2) activated by the push-button (5) and the onboard computer,
    an electronic module having a control circuit (7) connectable to the push-button (5) and to the onboard computer, a voltage adjuster (13), a ceramic resonator (17) and a power stage (3;4) connected to the horn,
    said electronic module having a programmable microprocessor (6) controlled by said control circuit (7) and connected to the power stage (3;4) for activating the horn in said acoustic warning and signalling buzzer functions, said programmable microprocessor having software that allows a user to program and modify the sequence, duration, frequency and sound level of said sound cycles.

2. The multi-function electronic horn warning system according to claim 1, wherein said horn of the acoustic warning function, is activated when voltage passes on a lead (15) coming from a battery (12) upon pressing the push-button (5).

3. The multi-function electronic horn warning system according to claim 1, wherein the signalling buzzer function is activated when a codified electric signal passing on a lead (15') is transmitted to the programmable microprocessor from the onboard computer of the motor-vehicle.

4. The multi-function electronic horn warning system according to claim 1, wherein during the signalling buzzer function said system is operative to generate a plurality of distinct sound cycles relating to safety belts, switched on lights, on-alarm, obstacle in backing, opening/closing of doors and/or motor hood and/or trunk.

5. The multi-function electronic horn warning system according to claim 4, wherein during the execution of any sounds cycles, a pressing of the push-button (5) activates the acoustic warning function.

6. The multi-function electronic horn warning system according to claim 1, wherein the programmable microprocessor (6) is in communication with the ceramic resonator (17) that generates an operating and control frequency for the coded signals.

7. The multi-function electronic horn warning system according to claim 6, wherein the power stage (3;4) is disconnected and connected to the horn (1;2) with a function of opening and closing of the voltage passage at said operating and control frequency of said ceramic resonator.

8. The multi-function electronic horn warning system according to claim 1, further having a first lead (11) connected to a positive pole (+) of battery (12) through the voltage adjuster (13); a second lead (14) connected directly to a negative pole (−) of said battery (12); a third lead (15, 15') connected to the onboard computer and the push-button (5) connected to the positive pole of the battery (12).

9. The multi-function electronic horn warning system according to claim 1, further having a horn (2;1) connected to a second power stage (4;3) being connected to the programmable microprocessor.

10. The multi-function electronic horn warning system according to claim 1, wherein the modification of the sound cycle is made through the onboard computer.

* * * * *

UNITED STATES PATENT AND TRADEMARK OFFICE
CERTIFICATE OF CORRECTION

PATENT NO. : 6,788,188 B2
DATED : September 7, 2004
INVENTOR(S) : Alain Sague

It is certified that error appears in the above-identified patent and that said Letters Patent is hereby corrected as shown below:

Column 1,
Line 52, replace "what" with -- the --.
Line 54, replace "multi function" with -- multi-function --.
Line 59, replace "is" with -- are --.
Line 59-60, replace "are an" with -- in an --.

Signed and Sealed this

Twenty-second Day of March, 2005

JON W. DUDAS
*Director of the United States Patent and Trademark Office*